(12) United States Patent
Funada

(10) Patent No.: US 12,442,800 B2
(45) Date of Patent: Oct. 14, 2025

(54) ANALYZING DEVICE

(71) Applicant: SHIMADZU CORPORATION, Kyoto (JP)

(72) Inventor: Yasuhiro Funada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 539 days.

(21) Appl. No.: 17/672,482

(22) Filed: Feb. 15, 2022

(65) Prior Publication Data

US 2022/0170892 A1    Jun. 2, 2022

Related U.S. Application Data

(62) Division of application No. 15/506,820, filed as application No. PCT/JP2014/072533 on Aug. 28, 2014, now abandoned.

(51) Int. Cl.
- *G01N 30/36* (2006.01)
- *B01D 15/40* (2006.01)
- *G01N 30/32* (2006.01)

(52) U.S. Cl.
CPC ............. *G01N 30/36* (2013.01); *B01D 15/40* (2013.01); *G01N 30/32* (2013.01)

(58) Field of Classification Search
None
See application file for complete search history.

(56) References Cited

U.S. PATENT DOCUMENTS

| 4,976,750 A | * | 12/1990 | Munari | G01N 30/32 |
| | | | | 95/82 |
| 4,982,597 A | * | 1/1991 | Berger | G01N 30/30 |
| | | | | 73/23.25 |

(Continued)

FOREIGN PATENT DOCUMENTS

| JP | 60-008747 A | 1/1985 |
| JP | 04-332863 A | 11/1992 |

(Continued)

OTHER PUBLICATIONS

International Search Report for PCT/JP2014/072533, dated Dec. 2, 2014.

(Continued)

*Primary Examiner* — Justin N Olamit
(74) *Attorney, Agent, or Firm* — Sughrue Mion, PLLC

(57) ABSTRACT

An object of the present invention is to provide a highly versatile analyzing device that widens a range of analysable samples. There is provided an analyzing device 10 including: a splitting part 110 for causing fluid containing a sample component to flow separately in a first flow passage and a second flow passage; an analyzing column 109 provided on the first flow passage for separating the sample component from the fluid; a first back pressure regulating valve 111 corresponding to a first pressure controlling unit for controlling a pressure in the first flow passage; and a second back pressure regulating valve 112 corresponding to a second pressure controlling unit for controlling a pressure in the second flow passage, wherein flow rate of the fluid in the first flow passage and flow rate of the fluid in the second flow passage are controlled based on a ratio of the pressure in the first flow passage to the pressure in the second flow passage.

1 Claim, 3 Drawing Sheets

(56) References Cited

U.S. PATENT DOCUMENTS

| | | | |
|---|---|---|---|
| 6,637,263 B2 | 10/2003 | Zimmermann | |
| 7,237,573 B1 * | 7/2007 | Graham | G05D 7/0186 138/46 |
| 7,516,641 B2 * | 4/2009 | Lewis | G01N 30/32 73/1.16 |
| 9,163,618 B2 * | 10/2015 | Wikfors | G01N 30/32 |
| 2015/0021265 A1 | 1/2015 | Jackson | |
| 2015/0276689 A1 * | 10/2015 | Watanabe | G01N 30/06 422/89 |
| 2016/0069845 A1 * | 3/2016 | Fogwill | G01N 30/84 73/23.4 |

FOREIGN PATENT DOCUMENTS

| | | |
|---|---|---|
| JP | 2004-309135 A | 11/2004 |
| JP | 2010-101630 A | 5/2010 |

OTHER PUBLICATIONS

Written Opinion for PCT/JP2014/072533 dated Dec. 2, 2014. [PCT/ISA/237].

* cited by examiner

ANALYZING DEVICE

CROSS REFERENCE TO RELATED APPLICATIONS

This Application is a Divisional of application Ser. No. 15/506,820, filed Feb. 27, 2017, which is a National Stage of International Application No. PCT/JP2014/072533 filed Aug. 28, 2014, the contents of all of which are incorporated herein by reference in their entirety.

TECHNICAL FIELD

The present invention relates to an analyzing device that separates a plurality of components contained in a sample into the individual components, and specifically, relates to a chromatograph using supercritical fluid.

BACKGROUND ART

Supercritical fluid can be realized by holding fluid that is gas at normal temperature and normal pressure (for example, carbon dioxide) at higher temperature and pressure than those at the critical point of the fluid (in the case of carbon dioxide, the critical temperature is 31° C. and the critical pressure is 7.4 MPa). The supercritical fluid exhibits excellent ability as solvent to many substances, and is often used for supercritical fluid extraction (hereinafter referred to as SFE) and supercritical fluid chromatography (hereinafter referred to as SFC).

Patent Literature 1 discloses an extraction and separation/analyzing device using supercritical fluid which can perform any of SFE and SFC by switching between a flow system for SFE and a flow system for SFC with a switching valve. With separate SFE and SFC flow systems, a component extracted from a sample by SFE is first trapped in a trap column, and then, is eluted with a solvent. Therefore, in order to measure the SFE-extracted substances by the chromatograph, human intervention is needed for adjusting the concentration of the extracted substance and placing it in a sample introducing unit of the chromatograph. As such, with an off-line configuration in which extracted substances are not directly introduced into a column, a series of operations from extraction to analysis cannot be automatically performed.

Patent Literature 2 discloses an analyzing device using supercritical fluid which has an on-line configuration in which SFE and SFC are integrated into one flow system, and is capable of automatically performing a series of operations from extraction to analysis. An example of such an analyzing device with the on-line configuration is shown in FIG. 3.

The analyzing device 30 of FIG. 3 is configured of a cylinder 300, a pressurizing pump 301, a solvent container 302, a modifier pump 303, a first flow passage switching valve 304, a sample storing container 305, a temperature adjusting device 306, a needle 307, a second flow passage switching valve 308, an analyzing column 309, an ultraviolet detector (UV) 310, a back pressure regulating valve 311 and a mass spectrometer (MS) 312.

Carbon dioxide that is drawn out of the cylinder 300 by the pressurizing pump 301 and pressurized (to supercritical fluid) is sent, via the first flow passage switching valve 304 along with a modifier agent drawn out of the solvent container 302 by the modifier pump 303, to the sample storing container 305 which is temperature controllable by the temperature adjusting device 306. By the pressurizing pump 301 and the later-mentioned back pressure regulating valve 311, the pressure of the flow passage between them is set to a pressure exceeding the critical pressure, and the temperature of the sample storing container 305 is set to a temperature exceeding the critical temperature by the temperature adjusting device 306. Thereby, carbon dioxide is put into supercritical state inside the sample storing container 305, and the supercritical carbon dioxide, with its excellent capability as solvent, extract components from a sample in the sample storing container 305 (SFE).

The supercritical fluid containing the SFE-extracted components flows into the analyzing column 309 from the needle 307 attached to the sample storing container 305 via the second flow passage switching valve 308. The supercritical fluid containing the SFE-extracted components is separated to individual components by the analyzing column 309, and then, flows through the ultraviolet detector (UV) 310, the back pressure regulating valve 311 and the mass spectrometer (MS) 312, where the individual components are analyzed (SFC).

CITATION LIST

Patent Literature

[Patent Literature 1] JP 4-332863 A
[Patent Literature 2] JP 60-8747 A

SUMMARY OF INVENTION

Technical Problem

When an agricultural product is analyzed as a sample by a chromatograph to measure the amount of pesticide residues in the agricultural product using the conventional analyzing device 30, a large amount of substances that constitute noise to the analysis of the pesticide, such as pigments, lipids and saccharides in the agricultural product itself, are extracted in addition to the target component in the SFE-extracted components. With the configuration of the conventional analyzing device 30, when such a sample is analyzed, the entirety of the SFE-extracted components is introduced into the analyzing column 309. Consequently, the analyzing column 309 tends to deteriorate due to the large amount of unwanted constituents, and saturation of the ultraviolet detector (UV) 310 and contamination of the mass spectrometer (MS) 312 tend to arise. As such, for some samples, the analyzing device 30 may be burdened or correct measurement may be difficult, which narrows the range of analyzable samples of the analyzing device 30 and lessens its versatility.

A problem to be solved by the present invention is to provide a highly versatile analyzing device that widens the range of analyzable samples.

Solution to Problem

An analyzing device according to the present invention devised to solve the aforementioned problem includes:
a) a splitting part for causing fluid containing a sample component to flow separately in a first flow passage and a second flow passage;
b) a column provided on the first flow passage for separating the sample component from the fluid;
c) a first pressure controlling unit for controlling a pressure in the first flow passage; and
d) a second pressure controlling unit for controlling a pressure in the second flow passage, wherein flow rate of the fluid in the first flow passage and flow rate of the fluid in the second flow passage are controlled based on a ratio of the pressure in the first flow passage to the pressure in the second flow passage.

Moreover, an analyzing method according to the present invention devised to solve the aforementioned problem includes the steps of:
  a) controlling a pressure in a first flow passage by a first pressure controlling unit;
  b) controlling a pressure in a second flow passage by a second pressure controlling unit;
  c) controlling flow rate of fluid containing a sample component in the first flow passage and flow rate of fluid containing a sample component in the second flow passage based on a ratio of the pressure in the first flow passage to the pressure in the second flow passage;
  d) splitting the fluid to flow separately in the first flow passage and the second flow passage by means of a splitting part; and
  e) separating the sample component from the fluid using a column provided on the first flow passage.

The "fluid" is preferably supercritical fluid, but it is not limited to this, and it may be gas or liquid. When the fluid is supercritical fluid, the pressure in the first flow passage and the pressure in the second flow passage are set such that a sum of values of these pressures is a value of a pressure exceeding a critical pressure of the fluid.

Both of the first pressure controlling unit and the second pressure controlling unit may have pressure controlling valves, and the pressure controlling valves may be provided on the first flow passage and the second flow passage respectively.

Upstream of the splitting part, an extracting unit (SFE Unit) for performing extraction using supercritical fluid (SFE) may be connected, or a sample injecting unit (autosampler) may be connected. In other words, there may be applied an on-line configuration in which SFE and SFC are integrated into one flow system or a configuration in which only chromatography using supercritical fluid (SFC) can be performed.

Advantageous Effects of Invention

According to the analyzing device and the analyzing method according to the present invention having the aforementioned configurations, by changing the ratio of the pressure in the first flow passage to the pressure in the second flow passage using the first pressure controlling unit and the second pressure controlling unit, the flow rate of the fluid in the first flow passage and flow rate of the fluid in the second flow passage after split at the splitting part can be controlled. When a large amount of unwanted constituents for analysis are contained in the fluid containing the sample components, the flow rate of the fluid in the column provided on the first flow passage is reduced such that the entirety of the unwanted constituents is not introduced into the column. This can suppress deterioration of the column and can reduce burden on the analyzing device. In this way, a highly versatile analyzing device that can widen the range of analyzable samples can be provided.

DESCRIPTION OF EMBODIMENTS

Hereafter, modes for implementing the present invention are described with reference to embodiments.

First Embodiment

Figure 1:
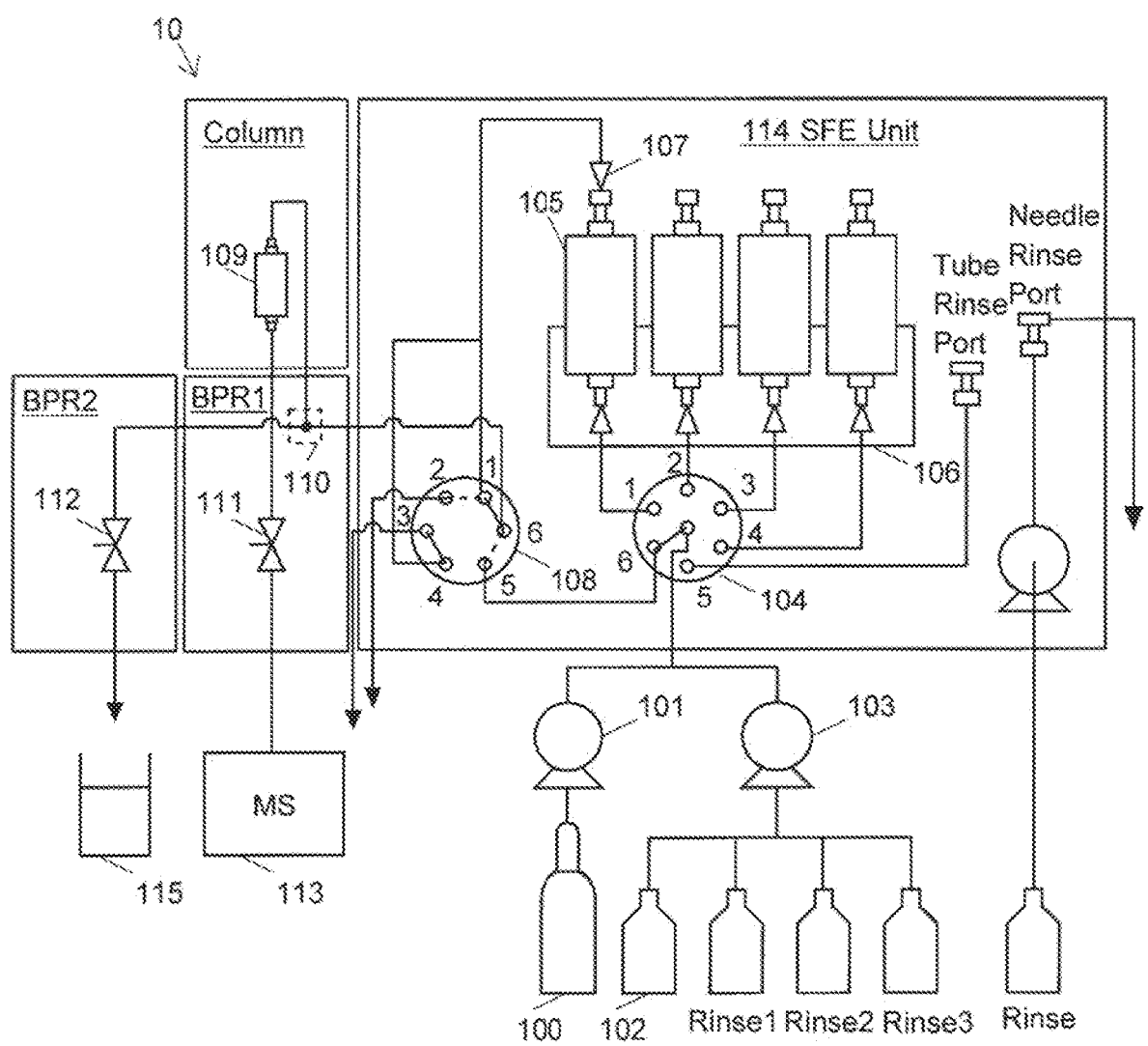
FIG. 1 is a schematic configuration diagram of an analyzing device according to a first embodiment of the present invention.

FIG. 1 is a schematic configuration diagram of an analyzing device of a first embodiment. The analyzing device 10 of this embodiment is configured of a cylinder 100, a pressurizing pump 101, a solvent container 102, a modifier pump 103, an extracting unit 114, an analyzing column 109, a splitting part 110, a first back pressure regulating valve 111, a second back pressure regulating valve 112, a mass spectrometer (MS) 113 and a recovering container 115. The extracting unit 114 is configured of a first flow passage switching valve 104, a sample storing container 105, a temperature adjusting device 106, a needle 107, a second flow passage switching valve 108, and pipes connecting these.

The analyzing device 10 of this embodiment has a feature of including the splitting part 110, the first back pressure regulating valve 111 and the second back pressure regulating valve 112. Fluid containing sample components flows in pipes separately in two flow passages of a first flow passage and a second flow passage by means of the splitting part 110. This embodiment has an on-line configuration in which the extracting unit 114 is directly connected upstream of the splitting part 110, and the analyzing column 109 is directly connected to the first flow passage downstream thereof. Hereafter, description will be made to a case where the extracting unit 114 extracts pesticide residues contained in a sample (agricultural product) by SFE using carbon dioxide as supercritical fluid, and the analyzing column 109 separates components in the pesticide residues. The first back pressure regulating valve 111 and the second back pressure regulating valve 112 that are pressure controlling valves correspond to a first pressure controlling unit and a second pressure controlling unit, respectively. The analyzing device 10 operates as follows to separate a plurality of components contained in extracted substances by the extracting unit 114 into the individual components using the analyzing column 109, thereby to identify the individual components by the mass spectrometer 113.

First, an agricultural product as a sample is put in the sample storing container 105, to one end of which the needle 107 is attached. These operations may be performed by a user or may be performed by a not-shown controlling device. In this way, the individual parts are connected as in FIG. 1. One or plurality of sample storing container s105 may be prepared as in FIG. 1, and a configuration may be adopted in which extraction for a plurality of samples can be performed.

Next, carbon dioxide (supercritical fluid) is drawn out of the cylinder 100 under pressurization by the pressurizing pump 101. Also, a modifier agent that is a polar solvent (methanol, ethanol or the like) is drawn out of the solvent container 102 by the modifier pump 103. These are sent, via the first flow passage switching valve 104, to the sample storing container 105 which is temperature controllable by the temperature adjusting device 106 such as a heater. When the pressure in a flow passage between the pressurizing pump 101 and the splitting part 110 is set to be a pressure exceeding the critical pressure (7.4 MPa) of carbon dioxide by the pressurizing pump 101 and the later-mentioned first back pressure regulating valve 111 and second back pressure regulating valve 112, and the sample storing container 105 is set to have a temperature exceeding the critical temperature (31° C.) of carbon dioxide by the temperature adjusting device 106, carbon dioxide is in the supercritical state (supercritical fluid) inside the sample storing container 105. Since carbon dioxide in the supercritical state exhibits excellent ability as solvent, it dissolves the sample (agricultural product) in the sample storing container 105. Thereby, in addition to pesticide residues that are the target components in the sample, a large amount of substances that constitute noise to analysis of the pesticide residues, such as pigments, lipids and saccharides, are extracted (SFE).

The supercritical fluid containing the SFE-extracted components reaches the splitting part 110 from the needle 107 via the second flow passage switching valve 108, and splits thereat into the first flow passage and the second flow passage. The analyzing column 109 heated at a temperature exceeding the critical temperature by a not-shown column oven is provided on the first flow passage, and thus the supercritical fluid containing the SFE-extracted components and flowing in the first flow passage is in the supercritical state inside the analyzing column 109. After the components are separated thereat into individual components, the supercritical fluid flows in the first back pressure regulating valve 111 and the mass spectrometer (MS) 113, where the individual components are analyzed (SFC). In this configuration, a detector (ultraviolet detector (UV) 310 or the like) (not shown) may be provided between the analyzing column 109 and the first back pressure regulating valve 111, and the mass spectrometer 113 is not essential. After the supercritical fluid containing the SFE-extracted components and flowing in the second flow passage is released from the supercritical state by flowing in the second back pressure regulating valve 112, it is recovered by the recovering container 115.

Description will now be made to a case where structures (sectional shapes and sizes of sectional areas) and materials of the pipes constituting the first flow passage and the second flow passage are substantially the same and no difference occurs in resistances of the fluid due to them. In the case where the pipes constituting the first flow passage and the second flow passage have substantially the same structure, and the resistance of the analyzing column 109 is eliminated, flow rate of fluid in the first flow passage and flow rate of fluid in the second flow passage are determined by a split ratio depending on the ratio of the pressures in these flow passages.

Assume that the pressure in the first flow passage controlled by the first back pressure regulating valve 111 is $P_1$, the pressure in the second flow passage controlled by the second back pressure regulating valve 112 is $P_2$, and the resistance of the analyzing column 109 is eliminated for convenience of description. When the flow rate upstream of the splitting part 110 is, for example, 10 mL/min, the split ratio of the first flow passage to the second flow passage can be set to be 1:99, that is, $P_1=99P_2$, and most of the fluid flows in the second flow passage at low pressure, and the flow rate of the fluid in the analyzing column 109 reaches 0.1 mL/min. In reality, although the resistance of the analyzing column 109 cannot be ignored, the values of the pressures $P_1$ and $P_2$ which realize a desired split ratio can be grasped by investigating relation between the ratio of the pressures P1 to P2 and the flow rate in advance thorough a preliminary experiment. When using supercritical fluid, the sum of the values of the pressure $P_1$ in the first flow passage and the pressure $P_2$ in the second flow passage should be set to be the value of a pressure exceeding the critical pressure of the fluid.

By changing the ratio of the pressure $P_1$ in the first flow passage to the pressure $P_2$ in the second flow passage using the first back pressure regulating valve 111 and the second back pressure regulating valve 112 as above, the flow rate of the fluid in the first flow passage and the flow rate of the fluid in the second flow passage after split at the splitting part 110 can be controlled. When a large amount of substances that constitute noise to analysis are contained in the fluid containing the sample components, the flow rate of the fluid in the analyzing column 109 provided on the first constitute noise to the is reduced as in the aforementioned example of the split ratio 1:99 in order to prevent the entirety of the fluid from being introduced into the analysing column 109. This supresses, deterioration of the analyzing column 109 and reduces burden on the analyzing device 10. In this way, even a sample from which a large amount of substances that are unwanted constituents can be an analysis target, which can enhance versatility of the analyzing device.

Figure 3:
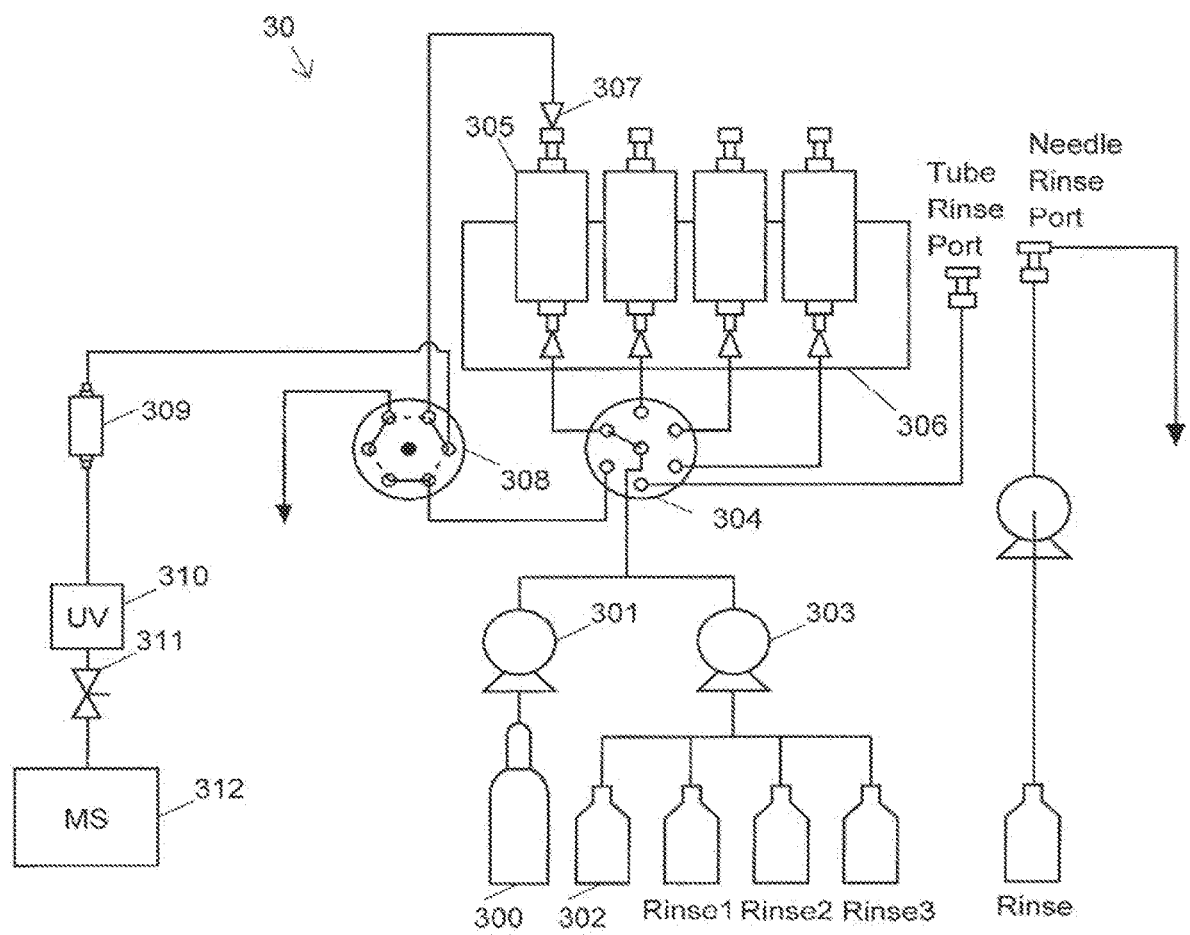
FIG. 3 is a schematic configuration diagram of a conventional analyzing device.

In the conventional on-line configuration shown in FIG. 3 in which SFE and SFC are integrated into one flow system, while it is desired for SFE to increase the flow rate in the sample storing container 305 for prioritizing the speed for extraction, it is desired for SFC to reduce the flow rate in the analyzing column 309 for prioritizing separation using the analyzing column 309. In other words, since SFE and SFC have a trade-off relationship for the flow rates, extraction time has had to be sacrificed to prioritize precision of separation by SFC, or the precision of separation has had to be sacrificed to prioritize the speed of extraction by SFE, or an intermediate flow rate has had to be set such that both of the extraction time and the precision of separation were sacrificed in some extent. Therefore, there has been conventionally a case where since the flow rate of the fluid containing the sample components and flowing in the analyzing column 309 is larger than that suitable for SFC, the fluid has passed through the analyzing column 309 without sufficient separation of the sample components, which causes peak broadening (causes broad peaks). When using supercritical fluid, its excellent ability as solvent sometimes exceed the trapping ability of the analyzing column 309, which further causes broad peaks. Such broad peaks lead to insufficient separation of the components, which interrupts accurate analysis.

On the contrary, in the configuration of this embodiment, the flow rate of the fluid in the analyzing column 109 can be changed by changing the ratio of the pressure $P_1$ in the first flow passage to the pressure $P_2$ in the second flow passage. Therefore, in the case of employing the configuration in which the extracting unit 114 for performing extraction using supercritical fluid (SFE) is provided upstream of the splitting part 110, the flow rate in the analyzing column 109 provided on the first flow passage can be reduced while the flow rate in the sample storing container 105 in the extracting unit 114 is increased, which can realize the flow rates respectively suitable for SFE and SFC. Thereby, in an on-line configuration in which SFE and SFC are integrated into one flow system, accurate analysis in which the sample components are sufficiently separated in the analyzing column 109 and broad peaks are reduced is possible.

Moreover, because a portion of the fluid containing SFE-extracted components is recovered into the recovering container 115 in an on-line configuration, the portion can be subjected to subsequent analysis using another analyzing device as in the case of an off-line configuration.

In this embodiment, although the example is described in which the first back pressure regulating valve 111 and the second back pressure regulating valve 112 correspond to the first pressure controlling unit and the second pressure controlling unit, respectively, and have the same piping structures, it is not limited to this, and a mechanism in which structures (sectional shapes and sizes of sectional areas) of pipes constituting the first flow passage and the second flow passage are different from each other may be used for the first pressure controlling unit and the second pressure controlling unit.

Second Embodiment

Figure 2:
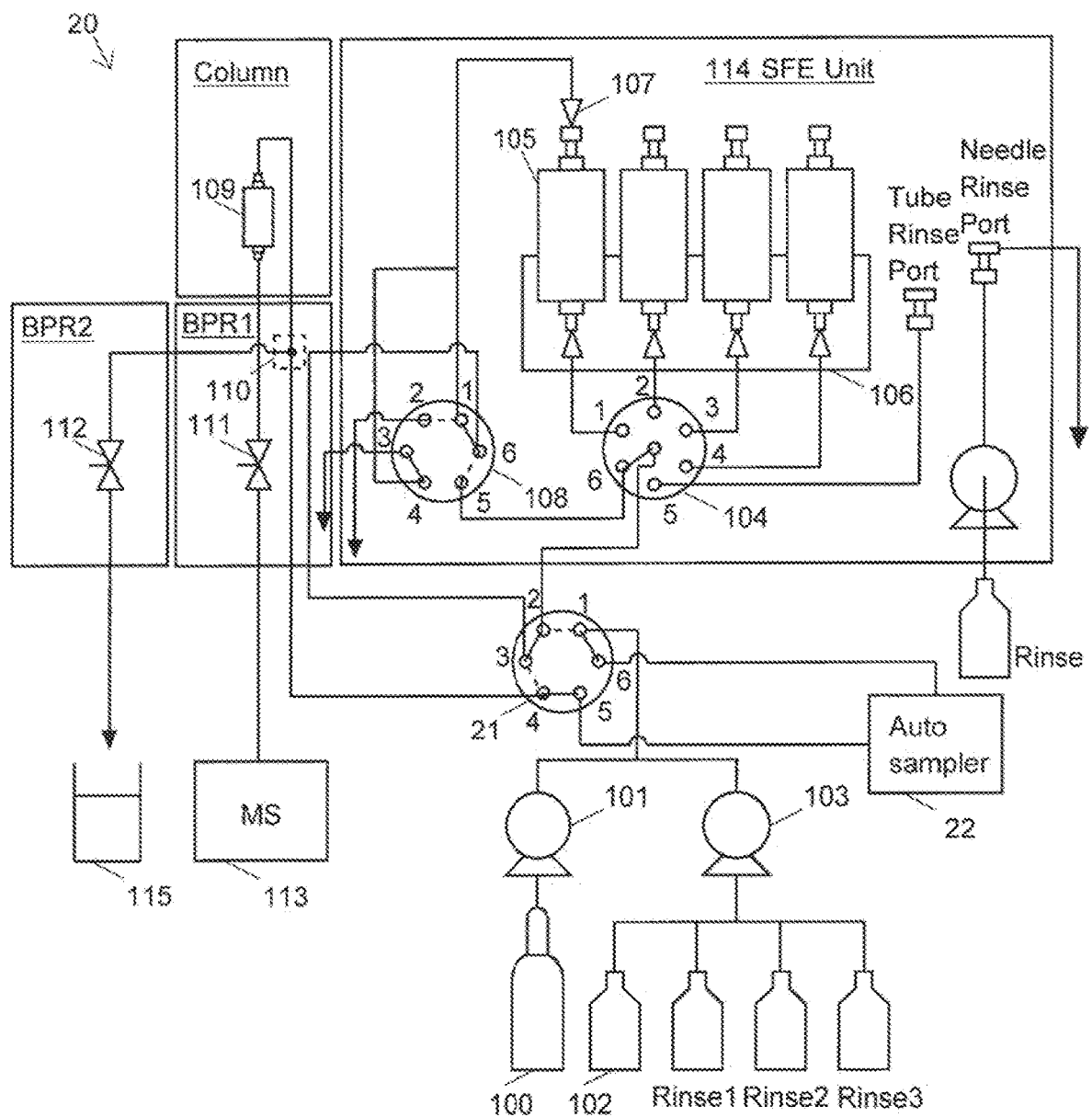
FIG. 2 is a schematic configuration diagram of an analyzing device according to a second embodiment of the present invention.

FIG. 2 is a schematic configuration diagram of an analyzing device of a second embodiment. The analyzing device 20 of this embodiment includes a third flow passage switching valve 21 and an autosampler 22 in addition to the similar configuration to that of the analyzing device 10 of the first embodiment including the cylinder 100, the pressurizing pump 101, the solvent container 102, the modifier pump 103, the extracting unit 114, the analyzing column 109, the splitting part 110, the first back pressure regulating valve 111, the second back pressure regulating valve 112, the mass spectrometer (MS) 113 and the recovering container 115.

In this embodiment, the third flow passage switching valve 21 is connected upstream of the splitting part 110, and the splitting part 110 is connected to the extracting unit 114 or the autosampler 22 by changing connections between ports in the valve 21 as shown in dotted lines or solid lines. The autosampler 22 corresponds to a sample injecting unit. A configuration in which the splitting part 110 is connected to is the same with that in the first embodiment, and hereafter, description will be made to a configuration in which the splitting part 110 is connected to the autosampler 22 and only chromatography (SFC) using supercritical fluid can be performed.

Under pressurization by the pressurizing pump 101, carbon dioxide (supercritical fluid) is drawn out of the cylinder 100. Also, a modifier agent that is a polar solvent (methanol, ethanol or the like) is drawn out of the solvent container 102 by the modifier pump 103. They are sent to the autosampler 22 as a mobile phase (fluid) through the third flow passage switching valve 21 provided between the pressurizing pump 101 and the modifier pump 103, and the first flow passage switching valve 104, and a sample is injected in the autosampler 22. The sample injected by the autosampler 22 reaches the splitting part 110 again via the third flow passage switching valve 21 on a flow of the mobile phase. In other words, in place of fluid containing SFE-extracted components using the extracting unit 114, the mobile phase containing the sample is supplied to the splitting part 110. Then, after the components are separated into individual components in the analyzing column 109 similarly to the first embodiment, the mobile phase flows in the first back pressure regulating valve 111 and the mass spectrometer (MS) 113, where the individual components are analyzed (SFC). Also in this embodiment, a detector (ultraviolet detector (UV) 310 or the like) (not shown) may be provided between the analyzing column 109 and the first back pressure regulating valve 111, and the mass spectrometer 113 is not an essential configuration.

In this way, in the analyzing device 20 of this embodiment, a user can freely select and use the on-line configuration in which SFE and SFC are integrated into one flow system or the configuration in which only chromatography (SFC) using supercritical fluid can be performed by changing the connections between the ports in the third flow passage switching valve 21. Therefore, a sample is not limited to one in the state before performing SFE, which can widen the range of analysable samples more than conventional and can enhance versatility of an analyzing device.

The aforementioned embodiments are merely examples of the present invention, and it is apparent that proper variations, modification and additions within the spirit of the present invention are included in the scope of the appended claims of the present application. In any of the aforementioned embodiments, while description has been made to the case where fluid containing sample components flows separately in two flow passages of the first flow passage and the second flow passage at the splitting part 110, a configuration of an analyzing device according to the present invention is not limited to this, but it may be configured such that it flows separately in two or more plural flow passages at the splitting part.

REFERENCE SIGNS LIST 10, 20, 30 . . . Analyzing Device
21 . . . Third Flow Passage Switching Valve
22 . . . Autosampler
100, 300 . . . Cylinder
101, 301 . . . Pressurizing Pump
102, 302 . . . Solvent Container
103, 303 . . . Modifier Pump
104, 304 . . . First Flow Passage Switching Valve
105, 305 . . . Sample Storing Container
106, 306 . . . Temperature Adjusting Device
107, 307 . . . Needle
108, 308 . . . Second Flow Passage Switching Valve
109, 309 . . . Analyzing Column
110 . . . Splitting Part
111 . . . First Back Pressure Regulating Valve
112 . . . Second Back Pressure Regulating Valve
113 . . . Mass Spectrometer
114 . . . Extracting Unit
115 . . . Recovering Container
310 . . . Ultraviolet Detector
311 . . . Back Pressure Regulating Valve

The invention claimed is:

1. An analyzing method comprising steps of:
a) extracting a sample component and substances that constitute noise to analysis of the sample component by using supercritical fluid;
b) splitting the supercritical fluid containing the substances to flow separately in a first flow passage and a second flow passage by means of a splitting part;
c) controlling, by using a first pressure controlling unit for controlling a pressure in the first flow passage and a second pressure controlling unit for controlling a pressure in the second flow passage, flow rates of the supercritical fluid containing the substances that flow in each of the first flow passage and the second flow passage depending on a ratio of the pressure in the first flow passage to the pressure in the second flow passage;
d) separating the sample component from the supercritical fluid using a column provided on the first flow passage; and
e) setting a flow rate of the supercritical fluid containing the substances flowing in the first flow passage smaller than a flow rate of the supercritical fluid containing the substances flowing in the second flow passage, in the step of controlling.

* * * * *